United States Patent Office 3,374,229
Patented Mar. 19, 1968

3,374,229
3-OXO-5α,10α-DIHYDROXYESTRANE COMPOUNDS
Kanzo Sasaki, Osaka-shi, Japan, assignor to Shionogi & Co., Ltd., Osaka, Japan
No Drawing. Filed Dec. 22, 1965, Ser. No. 515,758
Claims priority, application Japan, Dec. 29, 1964, 39/74,388
8 Claims. (Cl. 260—239.55)

ABSTRACT OF THE DISCLOSURE

Hypocholesteremic 3-oxo-5α,10α-dihydroxyestranes are prepared by the action of an agent which is generally used for α-cis-glycol formation from a double bond on 3-protected-oxo-estr-5(10)-enes, followed by hydrolysis of ketal group.

---

The present invention relates to novel 5,10,17-trihydroxy-estrane compounds, especially to pharmaceutically useful steroidal compounds generally representable as:

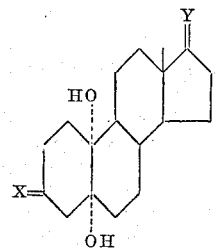

wherein X represents a lower alkylenedioxy group or an oxygen atom, Y represents

in which R represents a hydrogen atom, a lower alkyl group, a lower alkenyl group or a lower alkylnyl group, and R' represents a hydrogen atom, a lower alkanoyl group or benzyl.

The said 3-oxo-5α,10α-dihydroxyestrane compounds are useful, for example, as serum lipid shifting agents valuable in the treatment of atherosclerosis in warm-blooded animals. For example, 5,10,17β-trihydroxy-5α,10α-estran-3-one (subcutaneous) and 17α-methyl-5,10,17β-trihydroxy-5α,10α-estran-3-one (oral) each decreased the total cholesterol level about 18% in plasma and 15% in ratio of levels of cholestrol/phospholipids (plasma total) in a test wherein 1 mg. of each is administered to rats for 10 consecutive days. In addition it may be noted that the compounds do not inhibit the physiologically normal biosynthesis of cholesterol and do not produce any physiologically harmful intermediates in the said cholesterol biosynthesis route. Moreover the compounds exhibit rather slight hormonal side-effects.

The said 3-oxo-5α,10α-dihydroxyestrane compound can be prepared from the corresponding starting material of the formula:

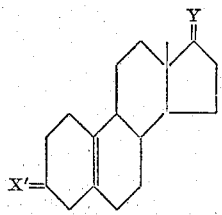

wherein X' represents a lower alkylenedioxy group and Y has its above-noted significance, by hydroxylation with a hydroxylating agent, followed by hydrolysis of the resultant product with acid.

As the said lower alkyl group in the above definition of R, a lower alkyl having 1 to 8 carbon atoms, especially methyl, ethyl, propyl, hexyl octyl or isopropyl, is preferred. As the said lower alkenyl or alkynyl group in the same R, an unsaturated group having 1 to 8 carbon atoms, especially vinyl, ethynyl, allyl, propargyl, hexenyl or isopentenyl, is preferred. As the said lower alkanoyl group in the above definition of R', a lower alkanoyl group having 1 to 8 carbon atoms, especially formyl, acetyl, propionyl, butyryl, trimethylacetyl, tert.-butylacetyl, octanoyl or the like, is preferred. As the said lower alkylenedioxy group in the above definitions of X' and Y, an alkylenedioxy group having 1 to 5 carbon atoms, especially methylenedioxy, ethylenedioxy, propylenedioxy or the like, is preferred.

The hydroxylation, which conducts the 5(10)-double bond mainly to the 5α,10α glycol system, may be carried out by the agent which is generally used for cis-glycol formation from a double bond, such as osmium tetroxide, ruthenium tetroxide, potassium permanganate, iodosobenzene acetate-osmium tetroxide mixture, or the like, in the conventional manner.

The hydrolysis, which converts a 3-ketal function to free 3-ketone, may be carried out by catalysis of acid substance, e.g. an organic acid such as formic acid, acetic acid, propionic acid, succinic acid, tartaric acid, malonic acid, p-toluenesulfonic acid or the like, an inorganic acid such as hydrochloric acid, sulfuric acid, perchloric acid or the like, or an acidic salt or buffer such as potassium hydrogen sulfate, phosphate buffer or the like, in the conventional manner.

In the process, there may preferably be applied an interconversion between a free function and a corresponding functional derivative, e.g. 17β-hydroxyl and its lower alkanoyl esters or benzyl ether, for the isolation and purification of the reaction products more conveniently employed in the recovery procedure, such as extraction, recrystallization, chromatography or the like.

Further, chemical transformations may be carried out within the definition of Y, relative to 17-substitution, at an appropriate stage in the process. For example, a 17β-hydroxy (17α-H) compound can be converted to the corresponding 17-oxo compound by a conventional oxidation with chromic acid, chromic anhydride (chromium trioxide), N-halocarbonamide or imide or by the Oppenauer oxidation before or after the said hydroxylating reaction; the 17-oxo compound can be converted to the corresponding 17α-lower alkyl or alkynyl(17β-OH) compound by reaction with the corresponding Grignard reagent or lithium compound of a lower alkane or alkyne such as methylmagnesium iodide, ethylmagnesium iodide, butylmagnesium bromide, butyllithium, ethynyllithium, propargyllithium or the like in the conventional manner before or after the said hydroxylating reaction; and the said 17α-alkynyl group can be hydrogenated by the conventional method using a catalyst such as palladium, platinum or nickel, before or after the said hydroxylating reaction.

The pharmaceutically valuable compounds of the invention may be administered in conventional pharmaceutical formulations, such as injections, tablets, pills, powders, etc., which can be prepared in admixture with ordinarily used pharmaceutically acceptable carriers, excipients or the like, such as surface active agents, inorganic salts, talc, lactose, etc., to animals suffering from atherosclerosis.

*Example 1.—Preparation of 5,10,17β-trihydroxy-5β,10β- and -5α,10α-estran-3-one*

(1) A suspension consisting of 17β-hydroxy-5(10)- estren-3-one (J. Am. Chem. Soc., 75, 5366 (1953)) (1 part by weight) and ethylene glycol (50 parts by volume) is, after addition of anhydrous benzene (40 parts by volume), distilled azeotropically to remove trace moisture. To the mixture there is added malonic acid (0.1 part by weight) and the resultant mixture is stirred for 10 hours at room temperature and then let stand overnight. The reaction mixture is neutralized with aqeuous diluted sodium carbonate solution and extracted with ether. The extract affords crude 3,3-ethylenedioxy - 5(10) - estren-17β-ol (1.2 parts by weight) on evaporation.

(2) The above-mentioned ketal compound is dissolved in anhydrous benzene (40 parts by volume). To the solution there is added a mixture of osmium tetroxide (1.1 parts by weight) and pyridine (2 parts by volume) and the resulting mixture is then subjected to reaction at room temperature for 93 hours. The reaction mixture is distilled under reduced pressure. To the resultant residue there are added benzene (65 parts by volume), ethanol (45 parts by volume), aqueous 10%-potassium hydroxide solution (50 parts by volume) and mannitol (10 parts by weight), and the resultant mixture is refluxed for 5 hours. The mixture is admixed with water and separated by separating funnel to collect the organic layer. The aqueous layer is, on the other hand, extracted with ether and then with chloroform. The organic layer is combined with the above etheral and chloroform extracts, washed with water, dried and evaporated, thus yielding a mixture of 3,3-ethylenedioxy - 5β,10β- and -5α,10α-estrane-5α,10α,17β-triols (0.9 part by weight).

(3) The above triol mixture is acetylated by acetic anhydride (10 parts by volume) in pyridine (20 parts by volume) at room temperature for 23 hours and treated thereafter in a conventional manner to afford crude crystalline product (1 part by weight). The crude product is subjected to thin-layer chromatography according to the above-mentioned procedure, extracted with chloroform and crystallized from ether to afford 3,3-ethylenedioxy-5β,10β-estrane-5,10,17β-triol 17-acetate, plates of M.P. 166–167.5° C. (0.4 part by weight) and 3,3-ethylenedioxy-5α,10α-estrane-5,10,17β-triol 17 acetate, needles of M.P. 196–196.5° C. (0.5 part by weight).

(4) 3,3-ethylenedioxy - 5β - estrane-5,10,17β - triol 17-acetate (3.2 parts by weight) is dissolved in a solution of potassium hydroxide (2 parts by weight) in methanol (100 parts by volume) and the resultant mixture is refluxed for 40 minutes. To the reaction mixture there is added Dry Ice to reduce the alkalinity from hydroxide to carbonate. The mixture is concentrated under reduced pressure and the resultant concentrate is, after dilution with water, neutralized by, ion exchange resin (such as "Amberlite IR-120"; trade mark) and evaporated under reduced pressure to afford crude crystalline substance (2.8 parts by weight). The substance is recrystallized from ether-hexane mixture to afford pure crystals of 3,3-ethylenedioxy-5β,10β-estrane-5,10,17β-triol, M.P. 173.5–175° C.

Following a similar hydroylsis procedure, 3,3-ethylenedioxy-5α,10α-estrane-5,10,17β-triol 17-acetate yields 3,3-ethylenedioxy - 5α,10α - estrane-5,10,17β-triol, M.P. 217–222° C.

(5) 3,3-ethylenedioxy - 5β,10β - estrane-5,10,17β-triol (1 part by weight) is dissolved in a mixture of acetic acid (40 parts by volume) and water (20 parts by volume). The resultant solution is heated for 20 minutes and then evaporated under reduced pressure to leave the crude product (0.95 part by weight). The product is subjected to thin-layer chromatography with the solvent system chloroform-acetone (1:1), extracted with chloroform-methanol (10:1) mixture and crystallized from dichloromethane-hexane-ether mixture to afford 5,10,17β-trihydroxy-5β,10β-estran-3-one, M.P. 118–120° C. (0.5 part by weight).

3,3-ethylenedioxy - 5α,10α - estrane-5,10,17β - triol (1.5 parts by weight) is dissolved in a mixture of acetic acid (20 parts by volume) and water (10 parts by volume). The resultant solution is maintained at 73–75° C. for 20 minutes and then evaporated. The resultant crude product is recrystallized from ether and acetone in order to obtain crystalline substance having M.P. 115–120° C. (1.2 parts by weight). Drying the substance at 60° C. for 2 hours yields 3,3-ethylenedioxy-5(10)-estren-17-one (3.2 parts by estran-3-one, M.P. 158–160° C.

*Example 2.—Preparation of 17α-methyl-5,10,17β-trihydroxy-5β,10β- and -5α,10α-estran-3-one*

(1) 3,3-ethylenedioxy-5(10)-estren-17β-ol (4.7 parts by weight) is oxidized in a mixture of pyridine (135 parts by volume) and chromium trioxide (10.7 parts by weight) for 1 hour with external ice-cooling and stirring. The reaction mixture is allowed to stand at room temperature for 24 hours, then mixed with ice water and extracted with ether. The extract is washed with dilute hydrochloric acid, water, aqueous dilute sodium carbonate solution, aqueous sodium chloride solution and water, in that order and then distilled to leave crude crystalline substance. Recrystallization of the substance from ether-hexane mixture and then from wet methanol yields 3,3-ethylenedioxy-5(10)-estren-17-one (3.2 parts by weight), M.P. 126–128° C. A chromatography over alumina of the mother liquor produces more of the same crystalline substance (0.3 part by weight).

(2) To the methyllithium solution prepared by the reaction of lithium metal (2 parts by weight) and methyl iodide (27.4 parts by weight) in anhydrous ether (110 parts by volume) in the presence of a small amount of iodine, a solution of 3,3-ethylenedioxy-5(10) estren-17-one (3.0 parts by weight) in anhydrous benzene (60 parts by volume) is added dropwise at room temperature. The resultant mixture is allowed to stand for 7 hours, then added to aqueous 10%-ammonium chloride solution with external ice-cooling and extracted with ether. The extract is washed with aqueous sodium chloride solution and then distilled to leave crude product (3.2 parts by weight), which is subjected to chromatography over alumina (50 parts by weight). The fraction eluted by the solvent system petroleum ether-benzene (5–1:1) gives the starting unchanged ketone compound (0.3 part by weight), and the fraction eluted by the solvent systems benzene from benzene-ether (40–15:1) gives 3,3-ethylenedioxy-17α-methyl-5(10)-estren-17β-ol (2.3 parts by weight), M.P. 114–116.5° C., after recrystallization from ether-hexane mixture.

(3) 3,3 - ethylenedioxy-17α-methyl-5(10)-estren-17β-ol (1.5 parts by weight) is dissolved in anhydrous benzene (30 parts by volume). To the resultant solution there is added osmium tetroxide (1.4 parts by weight) with external ice-cooling. The mixture is then subjected to reaction for 62 hours at room temperature. A stream of hydrogen sulfide is bubbled through the reaction mixture, which is then filtered to remove precipitates. The precipitates are washed with chloroform-methanol (10:1) mixture. The filtrate and washings are combined, washed with water, dried and distilled to leave crude product (1.7 parts by weight). The crude product is subjected to thin-layer chromatography with the solvent system chloroform-methanol (200:25) mixture. An adsorption band in the chromatogram is extracted with chloroform-methanol mixture and recrystallized from wet methanol to afford 3,3-ethylenedioxy-17α-methyl-5β,10β-estrane-5,10,17β-triol (0.5 part by weight), M.P. 164–165.5° C. Another band in the same chromatogram affords 3,3-ethylenedioxy-17α-methyl-5α,10α-estrane - 5,10,17β - triol (0.7 part by weight), M.P. 265–268° C. by extraction with chloroform-methanol mixture followed by recrystallizations using acetone and methanol-chloroform mixture.

(4) A mixture of 3,3-ethylenedioxy-17α-methyl-5β,10β-estrane-5,10,17β-triol (3.5 parts by weight), acetic acid (100 parts by volume) and water (30 parts by volume) is heated to around 80° C. for 15 minutes and evaporated under reduced pressure to leave crude crystalline product (3.1 parts by weight). The crude product is subjected to thin-layer chromatography with the solvent system chloroform-methanol (10:1), extracted with chloroform-methanol (10:1) and recrystallized from acetone-hexane mixture to yield 17α-methyl-5,10,17β-trihydroxy-5β,10β-estran-3-one (2.5 parts by weight), M.P. 181–182° C.

3,3-ethylenedioxy-17α-methyl-5α,10α-estrane - 5,10,17β-triol correspondingly produces 17α - methyl-5,10,17β-trihydroxy-5α,10α-estran-3-one, M.P. 202–210° C. by hydrolysis with acetic acid followed by recrystallization from wet methanol.

*Example 3.—Preparation of 17β-acetyloxy-5,10-dihydroxy-5β,10β-estran-3-one*

(1) 3,3-ethylenedioxy-5(10)-estren-17β-ol (4 parts by weight) is dissolved in a mixture of pyridine (40 parts by volume) and acetic acid (40 parts by volume), the resultant solution is warmed on a water bath for 1 hour and thereafter treated in a conventional manner. The crude product thereby obtained is chromatographed over alumina to afford 3,3-ethylenedioxy-5(10)-estren-17β-ol acetate (3.3 parts by weight), M.P. 102–103° C.

(2) 3,3-ethylenedioxy-5(10)-estren-17β-ol acetate (1 part by weight) is oxidized by osmium tetroxide and decomposed by mannitol, in the similar manner to the above Example 1 (2), to afford a mixture of 3,3-ethylenedioxy-5β,10β- and -5α,10α-estrane-5,10,17β-triols (0.7 part by weight).

(3) The above-prepared triol mixture (0.7 part by weight) is chromatographed over alumina (280 parts by weight). The fraction eluted with benzene-chloroform (10–1:1) system affords 3,3-ethylenedioxy-5β,10β-estrane-5,10,17β-triol, M.P. 173.5–175° C. (0.4 part by weight) after recrystallization from ether-hexane mixture. The fraction eluted with chloroform-methanol (10:1) system affords 3,3-ethylenedioxy-5α,10α-estrane - 5,10,17β - triol, M.P. 217–222° C. (0.2 part by weight) after sequential recrystallizations with ether-hexane and dichloromethane-hexane.

(4) 3,3-ethylenedioxy-5β,10β - estrane - 5,10,17β - triol (3.1 parts by weight) is dissolved in a mixture of pyridine (20 parts by volume) and acetic anhydride (15 parts by volume) and the resulting mixture is heated for 1 hour on a water bath. The reaction mixture is evaporated under reduced pressure. The residue is azeotropically distilled by addition of hexane to remove acetic anhydride and then recrystallized from acetone-hexane mixture, thereby yielding the corresponding 17-acetate, M.P. 166–167.5° C. (3.4 parts by weight).

3,3-ethylenedioxy-5α,10α - estrane - 5,10,17β - triol (1.4 parts by weight) is acetylated and treated similarly and recrystallized from acetone-hexane, thereby yielding the corresponding 17-acetate, M.P. 193–194.5° C.

(5) 3,3-ethylenedioxy-5β,10β-estrane-5,10,17β-triol 17-acetate (9.6 parts by weight) is dissolved in a mixture of acetic acid (2000 parts by volume) and water (500 parts by volume), warmed for 30 minutes on a water bath, and evaporated under reduced pressure to produce a crude crystalline substance. The substance is subjected to thin-layer chromatography with ether as the developing solvent, and recrystallized from an acetone-hexane mixture to yield 17β-acetyloxy-5,10-dihydroxy-5β,10β-estran-3-one, M.P. 183–185° C. (5.1 parts by weight).

3,3-ethylenedioxy-5α,10α-estrane-5,10,17β-triol 17-acetate yields 17β-acetyloxy-5,10-dihydroxy-5α,10α-estran-3-one, following the preceding procedure.

*Example 4.—Preparation of 5,10,17β-trihydroxy-5β,10β- and -5α,10α-estran-3-ones*

(1) 3,3-ethylenedioxy-5(10)-estren-17β-ol (4.3 parts by weight) is dissolved in anhydrous toluene (20 parts by volume) in nitrogen atmosphere. The resulting solution is refluxed for 150 minutes with portionwise addition of sodium hydride (0.8 part by weight) under stirring. To the solution there is added dropwise a solution of benzyl bromide (2.8 parts by weight) in anhydrous toluene (8 parts by volume) and the thus obtained mixture is refluxed for 120 minutes. The reaction mixture is, after addition of water, extracted with ether. The ethereal extract is washed with aqueous saturated sodium chloride solution, dried over anhydrous sodium sulfate and evaporated under reduced pressure to leave a yellow oil (6.5 parts by weight). The oil is chromatographed over alumina (300 parts by weight). The fraction eluted with solvent system hexane-benzene yields crystalline 3,3-ethylenedioxy-5(10)-estren-17β-ol benzyl ether, M.P. 81.5–83° C. (3.7 parts by weight) after recrystallization from dilute aqueous ethanol.

(2) 3,3-ethylenedioxy-5(10)-estren-17β-ol benzyl ether (3 parts by weight) is dissolved in a mixture of anhydrous benzene (30 parts by volume) and pyridine (1 part by volume). Osmium tetroxide (2 parts by weight) is added to the solution and the resultant mixture is kept for 48 hours at room temperature. The reaction mixture is treated with hydrogen sulfide under cooling with ice and filtered to remove precipitates. The precipitates are washed with chloroform. The filtrate and washings are combined, and sequentially washed with water, aqueous 1%-acetic acid solution, aqueous 5%-sodium sulfate solution and water, dried over anhydrous sodium sulfate and then evaporated under reduced pressure to leave crude product (3 parts by weight). The product is subjected to thin-layer chromatography using ether as the developing solvent to separate two adsorption bands, which yield, respectively, 3,3-ethylenedioxy - 5β,10β - estrane-5,10,17β-triol 17-benzyl ether, M.P. 156–157.5° C. (1.3 parts by weight) and 3,3-ethylenedioxy - 5α,10α - estrane-5,10,17β-triol 17-benzyl ether, M.P. 164.5–166° C. (1.6 parts by weight) through recrystallization from ether.

(3) 3,3-ethylenedioxy-5β,10β-estrane-5,10-17β-triol 17-benzyl ether (1.6 parts by weight) is dissolved in a mixture of dioxane (40 parts by volume) and methanol (50 parts by volume) and catalytically hydrogenated over 10%-palladised carbon catalyst (0.8 part by weight). The reaction mixture is filtered. The filter cake is washed with chloroform-methanol mixture. The filtrate and washings are combined and evaporated to leave crude product (1.3 parts by weight). The product is subjected to thin-layer chromatography with the developing solvent system chloroform-acetone (2:1) and the resultant adsorption band (Rf=0.3) is treated to yield 3,3-ethylenedioxy-5β,10β-estrane-5,10,17β-triol (0.9 parts by weight), M.P. 173.5–175° C., through recrystallization from ether.

3,3 - ethylenedioxy - 5α,10α-estrane-5,10,17β-triol 17-benzyl ether (1.2 parts by weight) is dissolved in a mixture of dioxane (7 parts by volume) and methanol (40 parts by volume) and catalytically hydrogenated over 10%-palladised carbon catalyst (0.6 part by weight) to yield 3,3 - ethylenedioxy - 5α,10α-estrane-5,10,17β-triol (0.9 parts by weight), M.P. 217–222° C.

(4) 3,3-ethylenedioxy-5β,10β-estrane-5,10,17β-triol (1 part by weight) is dissolved in aqueous 70%-acetic acid solution (50 parts by volume) and the resultant solution is heated for 20 minutes on a water bath. The reaction mixture is then evaporated under reduced pressure to leave crude crystalline product (0.9 part by weight). The product is subjected to thin-layer chromatography with the solvent system chloroform-acetone (1:1) and treated to obtain 5,10,17β-trihydroxy-5β10β-estran-3-one, M.P. 118–120° C. (0.6 part by weight).

Similarly, 3,3-ethylene dioxy-5α,10α-estrane-5,10,17β-triol yields crystalline 5,10,17β-trihydroxy-5α,10α-estran-3-one, M.P. 158–160° C.

*Example 5.—Preparation of 5,10-dihydroxy-5β,10β- and 5α,10α-estrane-3,17-diones*

3,3 - ethylenedioxy-5(10)-estren-17-one (1.5 parts by weight) is dissolved in anhydrous benzene (30 parts by volume) and then osmium tetroxide (1.4 parts by weight)

is added to the solution. The resultant mixture is allowed to react at room temperature for 73 hours. The reaction mixture is thereafter treated in a manner described in the Example 2 (3), resulting in a mixture of 3,3-ethylenedioxy-5,10-dihydroxy-5β,10β- and -5α,10α-estran-17-ones (1.0 part by weight). The resultant mixture is chromatographed over alumina (230 parts by weight). The fraction eluted with hexane-benzene (10–1:1) yields 3,3-ethylenedioxy - 5,10 - dihydroxy - 5β,10β - estran-17-one, M.P. 180–182° C. (0.6 part by weight) after recrystallization from ether. The following eluates yield oily 3,3-ethylenedioxy-5,10-dihydroxy-5α,10α-estran-17-one (0.2 part by weight). Each product yields the corresponding deketalation compound e.g. 5,10-dihydroxy-5β,10β- or -5α,10α-estrane-3,17-dione according to a procedure similar to that described in Example 2 (4).

*Example 6.—Preparation of 17α-methyl-5,10,17β-trihydroxy-5β,10β-estran-3-one*

(1) 3,3 - ethylenedioxy-5β,10β-estrane-5,10,17β-triol (6.6 parts by weight) is oxidized by a mixture of chromium trioxide (10 parts by weight) and pyridine (300 parts by volume) at room temperature for 15 hours. The reaction mixture is treated thereafter in the manner described in Example 2 (1) to yield 3,3-ethylenedioxy-5,10-dihydroxy - 5β,10β-estran-17-one, M.P. 180–182.5° C. (4.9 parts by weight) after recrystallization from ether.

(2) 3,3 - ethylenedioxy-5,10-dihydroxy-5β,10β-estran-17-one (1.5 parts by weight) is dissolved in anhydrous benzene (100 parts by volume). The solution is added dropwise into a mixture prepared according to the reaction of lithium metal (0.6 part by weight) in anhydrous ether (200 parts by volume) and methyl iodide (8 parts by volume) in anhydrous ether (100 parts by volume). The resultant mixture is then allowed to react at room temperature for 4 hours with stirring. The reaction mixture is, after adding 2 drops of aqueous 10%-ammonium chloride solution, extracted with ether. The extract is washed with aqueous sodium chloride solution, dried over anhydrous sodium sulfate and evaporated to leave a syrupy substance (1.5 parts by weight). The product is subjected to thin-layer chromatography using chloroform-methanol (10:1) mixture as the developing solvent system. The adsorption band of Rf=0.4 yields 3,3-ethylenedioxy-17α-methyl-5β,10β-estrane-5,10,17β-triol, M.P. 164–165.5° C. (0.8 part by weight) by recrystallization from methanol.

(3) The resultant product yields the corresponding deketalation compound, 17α - methyl-5,10,17β-trihydroxy-5β,10β-estran-3-one, in a manner similar to that of Example 2 (4).

*Example 7.—Preparation of 3,3-ethylenedioxy-5β,10β- and -5α,10α-estrane-5,10,17β-triols*

To a suspension of ruthenium dioxide (7.4 parts by weight: 54.6%-purity) in carbon tetrachloride (600 parts by volume), there is added a solution of sodium periodate (trihydrate) (30.2 parts by weight) in water (800 parts by volume) with external ice-cooling and stirring, and the resulting mixture is stirred for 50 minutes under ice cooling. The resultant mixture is separated in a separating funnel to collect the organic layer (ruthenium tetroxide solution: Tetrahedron, 19, 1961 (1963)). To a solution of 3,3-ethylenedioxy-5(10)-estren-17β-ol 17-acetate (10 parts by weight) in carbon tetrachloride (200 parts by volume) at a temperature from −30 to −32° C., the said organic layer (previously cooled to −30 to −32° C.) is added. A reaction takes place. After 5 minutes the mixture becomes a slurry. Hydrogen sulfide is then passed through the reaction mixture to eliminate the ruthenium ion as precipitates, which are removed by filtration. The filter cake is washed with chloroform. The filtrate and washings are combined, washed with water and treated in the conventional manner to yield crude product (10.8 parts by weight). The product is separated according to conventional thin-layer chromatography by the developing solvent system chloroform-methanol (40:1) as in the foregoing examples, thereby yielding 3,3-ethylenedioxy-5β,10β-estrane-5,10,17β-triol 17-acetate, M.P. 166–167° C. (5.5 parts by weight) and 3,3 - ethylenedioxy-5α,10α-estrane-5,10,17β-triol 17-acetate, M.P. 196–196.5° C. (4.0 parts by weight), and which are recrystallized from ether.

What is claimed is:

1. A compound of the formula:

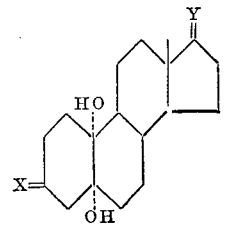

wherein X represents a lower alkylenedioxy group or an oxygen atom, Y represents

group, in which R represents a hydrogen atom, a lower alkyl group, a lower alkenyl group or a lower alkynyl group, and R' represents a hydrogen atom, a lower alkanoyl group or benzyl group.

2. The compound of claim 1 which is 5,10,17β-trihydroxy-5α,10α-estran-3-one.

3. The compound of claim 1 which is 17α-methyl-5,10-17β-trihydroxy-5α,10α-estran-3-one.

4. The compound of claim 1 which is 17β-acetyloxy-5,-10-dihydroxy-5α,10α-estran-3-one.

5. The compound of claim 1 which is 3,3-ethylenedioxy-5α,10α-estrane-5,10-17β-triol.

6. The compound of claim 1 which is 3,3-ethylenedioxy-5α,10α-estrane-5,10,17β-triol 17-acetate.

7. The compound of claim 1 which is 3,3-ethylenedioxy-17α-methyl-5α,10α-estrane-5,10-17β-triol.

8. The compound of claim 1 which is 3,3-ethylenedioxy-5α,10α-estrane-5,10,17β-triol 17-benzyl ether.

References Cited

UNITED STATES PATENTS 3,211,719   10/1965   Von Wartburg et al. _ 260—210.5

OTHER REFERENCES

Cross et al., J. Org. Chem., 29, 2195–2200 (1964).
Noller, Chemistry of Organic Compounds, 3rd ed. Philadelphia, W. B. Saunders Co. (1965), p. 816.

LEWIS GOTTS, *Primary Examiner.*

T. M. MESHBESHER, *Assistant Examiner.*